(12) United States Patent
Ganser et al.

(10) Patent No.: US 8,395,840 B2
(45) Date of Patent: Mar. 12, 2013

(54) APPARATUS FOR POSITIONING OPTICAL COMPONENTS IN AN OPTICAL DEVICE

(75) Inventors: Michael Ganser, Giessen (DE); Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 344 days.

(21) Appl. No.: 12/844,506

(22) Filed: Jul. 27, 2010

(65) Prior Publication Data

US 2011/0026112 A1 Feb. 3, 2011

(30) Foreign Application Priority Data

Jul. 30, 2009 (DE) .......................... 10 2009 035 365

(51) Int. Cl.
*G02B 21/00* (2006.01)
(52) U.S. Cl. ......... 359/381; 359/368; 359/384; 359/821
(58) Field of Classification Search .......... 359/368–390, 359/885–892, 896
See application file for complete search history.

(56) References Cited

U.S. PATENT DOCUMENTS

| | | | | |
|---|---|---|---|---|
| 4,421,411 A | * | 12/1983 | Ida | 356/418 |
| 4,486,078 A | * | 12/1984 | Hashimoto et al. | 359/381 |
| 5,867,310 A | * | 2/1999 | Hasegawa | 359/381 |
| 6,392,796 B1 | | 5/2002 | Schwab et al. | |
| 6,437,911 B1 | * | 8/2002 | Hasegawa | 359/381 |
| 8,223,428 B2 | * | 7/2012 | Hasegawa | 359/381 |
| 2004/0061861 A1 | | 4/2004 | Rentzsch | |
| 2008/0112070 A1 | * | 5/2008 | Tanibata et al. | 359/891 |

FOREIGN PATENT DOCUMENTS

| | | |
|---|---|---|
| DE | 1262121 | 2/1968 |
| DE | 29604667 | 10/1996 |
| DE | 19924686 | 11/2000 |
| EP | 1403672 | 3/2004 |

OTHER PUBLICATIONS

English abstract of the Germany reference No. DE 296 04 667.

* cited by examiner

*Primary Examiner* — Thong Nguyen

(74) *Attorney, Agent, or Firm* — Schlee IP International, P.C.; Alexander R. Schlee

(57) ABSTRACT

An apparatus for positioning optical components in an optical device and a microscope with such an apparatus are described, comprising a holding device having a plurality of receptacles on which the optical components can be fixed. A stepper motor comprises a motor shaft for rotating the holding device via a toothed belt and therefore positions the optical components. This allows to position optical components in the optical beam path with low noise and in a vibration-free manner.

10 Claims, 4 Drawing Sheets

APPARATUS FOR POSITIONING OPTICAL COMPONENTS IN AN OPTICAL DEVICE

CROSS-REFERENCE TO RELATED APPLICATION

This application claims the priority of the German patent application DE 10 2009 035 365.8 having a filing date of Jul. 30, 2009, the entire content of which is herewith incorporated by reference.

BACKGROUND OF THE INVENTION

The invention relates to an apparatus for positioning optical components in an optical device, comprising a holding device having a plurality of receptacles on which the optical components are held, wherein the holding device is rotatable into a plurality of predetermined rotary positions, in which rotary positions respectively one of the optical components is arranged in a target position, a motor comprising a motor shaft for rotating the holding device, a controller for controlling the motor and a transmitting mechanism for transmitting the rotary movement of the motor shaft into a rotary movement of the holding device. Further the invention relates to a microscope having such an apparatus.

Apparatuses of the aforementioned type are for example used in microscopes to pivot optical components such as objectives or filter blocks, which are held on a rotary disk, individually into a target position located in a beam path. Thereby it is important to bring the optical components into the target position as fast, noiseless and accurately as possible.

Conventional positioning apparatuses usually use gear motors which drive the rotary disk. Thereby a mechanical latching is assigned to each optical component, e.g. formed as latching notch formed on the disk, into which a spring-loaded ball latches. If the gear motor is provided with a freewheel, the disk can slightly freely move in the region of the target position, whereby the ball latches into the latching notch. Such a positioning apparatus is e.g. described in EP 1 403 672 B1. Regarding prior art further reference is made to DE 1 262 121 A, DE 296 04 667 U1 and DE 199 24 686 A1.

In positioning apparatuses of the aforementioned type it is a disadvantage that comparatively strong motors have to be used. This is due to the fact that in case of a change of position the motor first has to turn the disk out of the latching position, in which the disk is fixed. For this, a substantially higher force is necessary than would be necessary for only rotating the disk between the latching positions. Furthermore, with conventional positioning apparatuses there are unwanted noises and mechanical vibrations, when the spring-loaded ball runs over a latching notch with high speed during a rotary movement of the disk running over individual latching positions. This leads to impact stress of the notch flanks, when the ball entering the respective latching notch impinges on the notch flank being directed opposite to the moving direction.

Finally it is a disadvantage with conventional positioning apparatuses that the latching notches have to be formed (e.g. milled) on the rotary disk in precise positioning relative to the receptacles in which the optical components are held. A subsequent correction of positioning errors such as they occur e.g. with inclined optical components is not possible.

It is the object of the invention to provide an apparatus of the aforementioned type for positioning optical components in an optical device such that shifting of the optical components is as low-noise and vibration-free as possible. Further it is the object of the invention to provide a microscope in which optical components can be positioned with low noise and vibration-free.

SUMMARY OF THE INVENTION

According to the present invention, these and other objects are achieved by an apparatus for positioning optical components in an optical device, comprising: a holding device having a plurality of receptacles on which the optical components can be fixed, wherein the holding device is rotatable into a plurality of predetermined rotary positions, in which rotary positions respectively one of the optical components is arranged in a target position, a motor comprising a motor shaft for rotating the holding device, and a transmitting mechanism for transmitting the rotary movement of the motor shaft into a rotary movement of the holding device, wherein the transmitting mechanism comprises a toothed belt that is engaged with a first toothing arranged at the holding device and a second toothing arranged at the motor shaft, the first toothing includes $Z1$ teeth and the second toothing includes $Z2$ teeth and the ratio $Z1/Z2$ is n times the number of the receptacles, provided with uniform angular distances from each other on the holding device, for the optical components, wherein n is a natural integer not equal to 0, the motor is a stepper motor, and the stepper motor is installed such that the motor shaft thereof is in a full step position when one of the optical components is arranged in the target position.

According to the invention the transmission mechanism comprises a toothed belt which is engaged with a first toothing arranged at the holding device and a second toothing arranged at the motor shaft.

The use of a toothed belt allows for a low noise and vibration-free transmission of the rotary movement of the motor shaft to the holding device. Latching of the holding device for positioning an optical component in the target position is not necessary at all. Thus the mechanical stresses caused during rotation of the holding device inside the inventive apparatus are minimized, whereby the operating life of the apparatus is extended.

Furthermore, the fact that there is no latching allows switching to the different optical components faster than in the past. The solutions known from prior art usually use a bouncing latching spring or corresponding elements which vibrate when latching. This vibration has to die down before e.g. imaging can be started in the optical device. Such a vibration does not occur with the inventive apparatus using the toothed belt. Imaging can start directly after the target position has been reached.

DETAILED DESCRIPTION OF THE INVENTION

The first toothing includes $Z1$ teeth and the second toothing includes $Z2$ teeth and the ratio $Z1/Z2$ is n times the number of the receptacles, provided with uniform angular distances from each other on the holding device, for the optical components, wherein n is a natural integer not equal to 0. With this embodiment the motor shaft performs n full rotations when changing from one predetermined rotary position into the next predetermined rotary position of the holding device, i.e. when switching from one optical component to the next optical component. This facilitates the control of the motor, in particular when n equals 1, i.e. when the ratio $Z1/Z2$ is equal to the number of receptacles, provided on the holding device, for the optical components.

The motor is a stepper motor. Such a stepper motor guarantees an exact, step-by-step positioning of the optical components. As the inventive apparatus does not provide for latching of the holding device in the target position, a comparatively weak and thus cost-efficient stepper motor is sufficient to bring the holding device into the desired rotary position and hold it there.

The stepper motor is installed such that the motor shaft thereof is in a full step position when one of the optical components is arranged in the target position. This is advantageous when using a conventional stepper motor which does not only work in full steps, but e.g. in half steps, quarter steps etc. With a stepper motor of this type the largest holding forces as well as the highest positioning accuracy result in a full step position of the motor shaft in which two coils of the stepper motor being adjacent to each other are maximally energized. Thereby the optical component is locked exactly and with the highest possible holding force in the target position.

Preferably the controller comprises an initializing device which controls the stepper motor in the beginning of the operation of the apparatus such that the motor shaft is rotated into a predetermined initialization position. Thus it is assured that the holding device is in a specific rotary position in the beginning of the operation. Advantageously, the above-mentioned initialization position is one of the predetermined rotary positions in which one of the optical components is arranged in the target position.

For detecting the predetermined initialization position the initializing device preferably includes a light barrier, e.g. formed as fork light barrier, which detects an appropriate coding element, e.g. a light passage slot, when the holding device is in the initialization position.

When installing the optical components possibly a minimal residual error remains within the factory-made test tolerances. Depending on the application, this residual error may be undesirable, because it causes e.g. a very little lateral offset in an illumination beam path, e.g. an offset of the image of a field stop. When this offset is in the direction of rotation of the positioning apparatus, there is the possibility to do a fine correction by systematically positioning the optical components slightly next to the originally planned target position. This correctable offset can be in the angular range of a few seconds. For this, in a further advantageous embodiment, the controller controls the motor taking into consideration correction amounts which respectively indicate a correction offset with respect to the respective predetermined rotary position of the holding device.

The inventive apparatus is preferably determined for positioning objectives and/or filter blocks in a microscope which are usually held on rotary disks. However, the invention is not limited to such use. It is rather adapted to position arbitrary optical components, which are held on a holding device in an optical device and are rotated, precisely, low noise, vibration-free and fast.

The invention will be explained in the following on the basis of an embodiment with reference to the Figures.

DETAILED DESCRIPTION OF THE DRAWINGS

Figure 1:
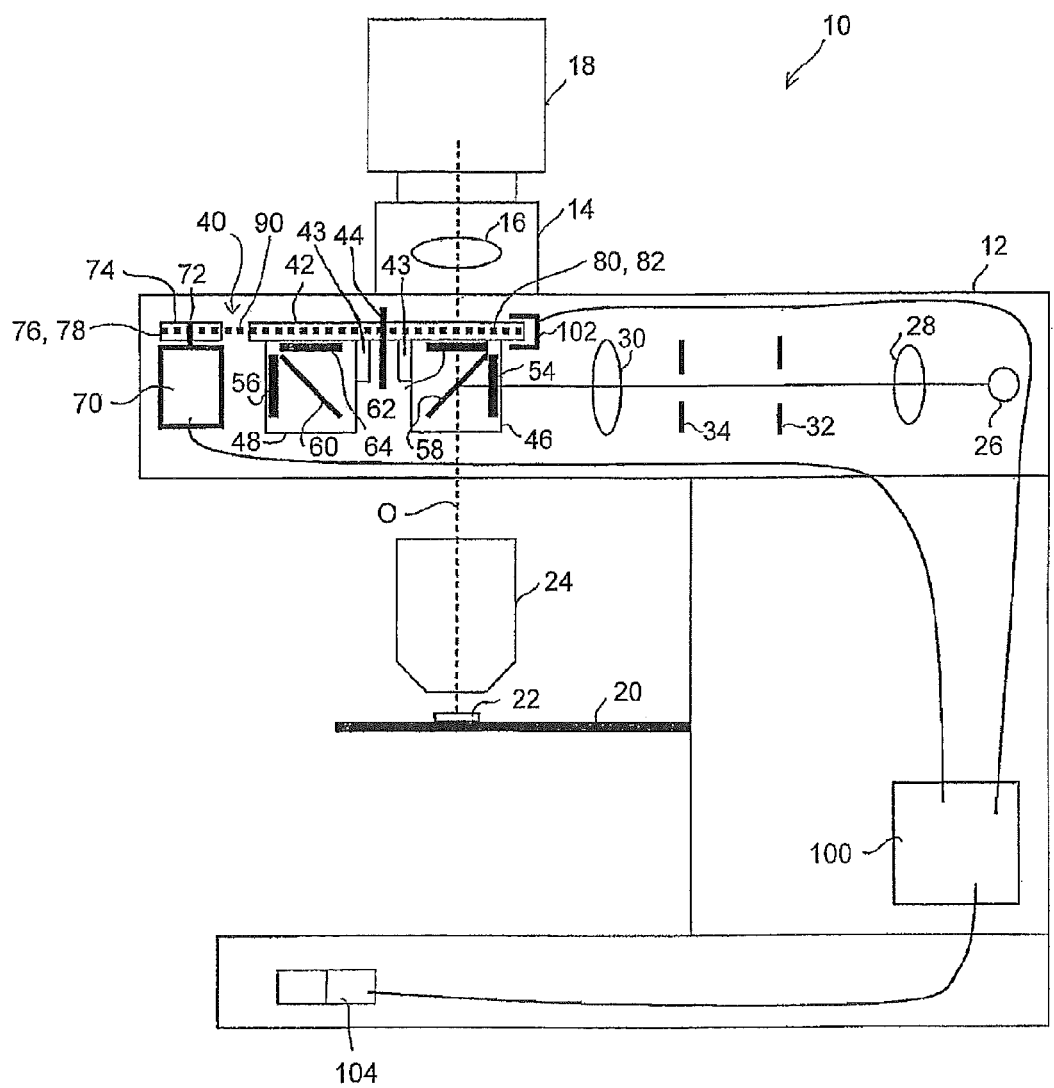
FIG. 1 shows a cross-sectional view of a microscope including a positioning apparatus according to a first embodiment.

FIG. 1 shows a fluorescence microscope 10 in cross section. The fluorescence microscope 10 has a microscope body 12 on which a tube 14 with a tube lens 16 is installed. A CCD-camera 18 is connected to the tube 14.

A stage 20 is attached to the microscope body 12 on which stage 20 a specimen 22 is arranged. The specimen 22 is imaged by an objective 24 and brought to view on the CCD-camera 18. An optical axis O passes through the objective 24.

In the upper portion of the microscope body 12 a light source 26 for emitting light is arranged, which light passes through the lenses 28 and 30. A first diaphragm 32 and a second diaphragm 34, which forms a field stop, are arranged between the two lenses 28 and 30.

The fluorescence microscope 10 includes a positioning apparatus, generally referred to by 40. The positioning apparatus 40 comprises a disk 42 which is rotatable about a rotation axis 44. Four filter blocks 46, 48, 50 and 52 are held on the disk 42 in receptacles 43 provided therefor, said receptacles 43 being not further illustrated in the Figures. In the cross-sectional view according to FIG. 1, only the filter blocks 46 and 48 are shown, whereas in the top view according to FIG. 2 all of the four filter blocks 46, 48, 50 and 52 are illustrated.

The filter blocks 46, 48, 50 and 52 respectively include an excitation filter 54 or 56, a dichromatic beam splitter 58 or 60 as well as a blocking filter 62 or 64 (cf. FIG. 1). The excitation filters 54, 56 only allow light components of the light emitted by the light source 26 to transmit, the wavelengths of which are suitable to excite the specimen 22 to emit fluorescence radiation. The dichromatic beam splitters 58, 60 reflect the excitation light transmitted by the excitation filters 54, 56 in the direction of the optical axis O, so that the excitation light falls through the objective 24 on the specimen 22. The blocking filters 62, 64 prevent the excitation light reflected by the specimen 22 into the objective 24 from getting into the tube 14.

The filter blocks 46, 48, 50 and 52 differ from each other in that the optical components 54, 56, 58 and 60 included therein have different characteristics, in particular filter characteristics. By pivoting the filter blocks 46, 48, 50 and 52 selectively into the optical axis O, as described in the following, different fluorescence incident light can be realized.

The positioning apparatus 40 further includes a stepper motor 70 having a rotatable motor shaft 72. A toothed disk 74 is installed on the motor shaft 72, said toothed disk 74 rotating with the motor shaft 72. The toothed disk 74 has a circumferential toothing 76 along its circumference, which is formed by a plurality of teeth 78.

The disk 42 on which the filter blocks 46, 48, 50 and 52 are held is also formed as toothed disk. It also includes a toothing 80 along its circumference, which is formed by a plurality of teeth 82. The toothing 80 of the disk 42, in the following referred to as first toothing, and the toothing 76 of the toothed disk 74, in the following referred to as second toothing, have corresponding pitches, i.e. their teeth 82 or 78 have the same distances from each other.

The first toothing 80 and the second toothing 76 are engaged with a toothed belt 90, which comprises a toothing with a pitch corresponding to the pitches of the first toothing 80 and the second toothing 76.

The toothed belt 90 serves to transmit the rotary movement of the motor shaft 72 and thus the toothed disk 74 to the disk 42. The reduction ratio, with which the rotary movement of the motor shaft 72 is transmitted to the disk 42 is determined by the ratio of the number Z1 of teeth 82 provided in the first toothing 80 to the number of teeth 78 provided in the second toothing 76. In the present embodiment the ratio Z1/Z2 equals 4 and is thus equal to the number of receptacles 43 provided on the disk 42, in which receptacles 43 the filter blocks 46, 48, 50 and 52 are held. Thereby it is achieved that starting from a rotary position of the disk 42, in which one of the filter blocks 46, 48, 50 and 52 is arranged in the target position, i.e. on the optical axis O, the disk 42 is turned by a quarter turn through a complete turn of the motor shaft 72 and thus the toothed disk 74, whereby the adjacent filter block is pivoted into the optical axis O.

The positioning apparatus 40 further comprises a controller 100 which is connected with the stepper motor 70 and controls said stepper motor 70 such that the disk 42 is rotated into the desired rotary positions in which respectively one of the filter blocks 46, 48, 50 and 52 is pivoted into the optical axis O. The controller 100 is further connected to a fork light barrier 102 serving to initialize the stepper motor 70 at the start of operation of the fluorescence microscope 10, i.e. to bring the motor shaft 72 into an initialization position. The initialization position is predetermined such that one of the filter blocks 46, 48, 50 and 52 is arranged in its target position on the optical axis O. For this, the fork light barrier 102 interacts with a coding element, not illustrated in the Figures, which is formed on the disk 42 and assigned to the initialization position. This coding element can e.g. be a slot passing through the disk 42, which, as soon as it is arranged in the region of the fork light barrier 102 allows a passage of light from a light transmitter to a light receiver, which are parts of the fork light barrier 102 and are arranged above or below the disk 42 (not illustrated in detail in FIG. 1). In case of light passage the fork light barrier 102 outputs a detection signal to the controller 100, whereby the controller 100 detects that the disk 42 is arranged in the predetermined initialization position.

Further an operating element 104 is arranged on the microscope body 12 which is connected with the controller 100. An operator can actuate the positioning apparatus 70 via the operating element 104 and as required bring one of the filter blocks 46, 48, 50 and 52 into the target position by rotating the disk 42. Further it is also possible to enter correction amounts which are assigned to the individual rotary positions of the disk 42 via the operating element 104. Via these correction amounts which are e.g. stored in a not shown memory included in the controller 100, slight misalignments of the filter blocks 46, 48, 50 and 52 can be corrected subsequently. The controller 100 then takes into account these correction amounts when controlling the stepper motor 70.

Figure 2:
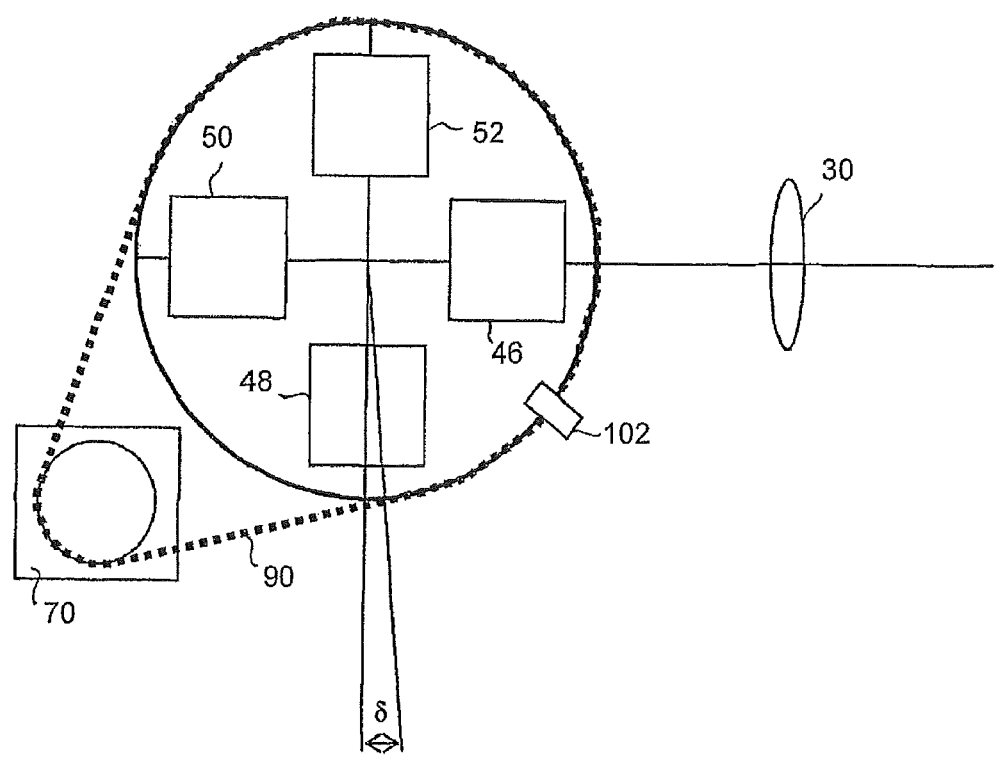
FIG. 2 shows a top view of the positioning apparatus.
Figure 3:
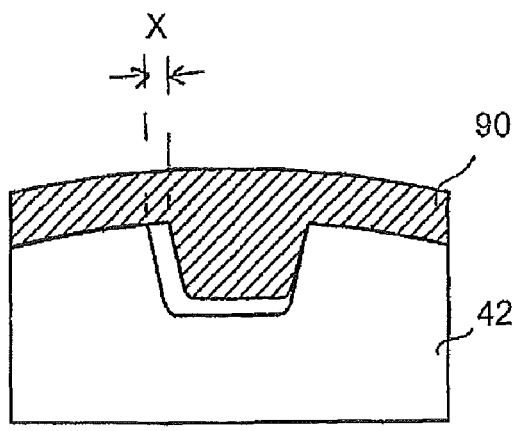
FIG. 3 shows illustrations of various embodiments of the toothed belt.
Figure 3:
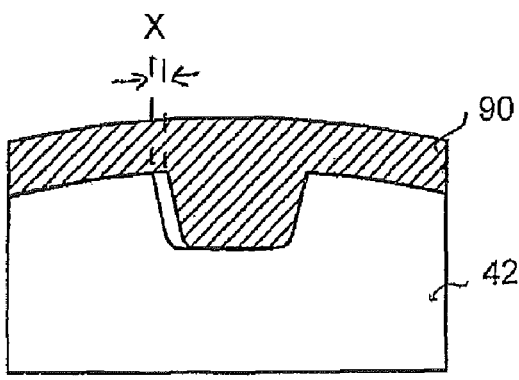
Figure 3:
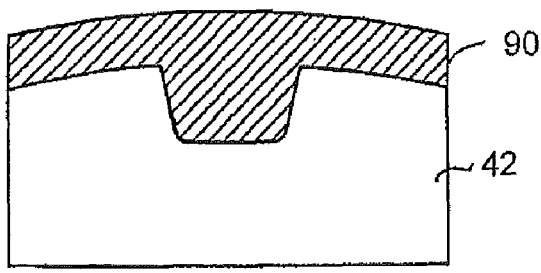

With reference to FIGS. 2 and 3, in the following the accuracy is discussed with which the positioning apparatus 70 moves the filter blocks 46, 48, 50 and 52 selectively into the target position. This accuracy influences the position of the field stop image at the location of the specimen 22. Thus the field stop 34 is imaged via the dichromatic beam splitter 58 or 60 onto the specimen 22. Different alignments of the filter blocks 46, 48, 50 and 52 on the disk 42 lead to shiftings of the field stop image at the location of the specimen 22.

A rotation of the disk 42 causes a horizontal movement of the field stop image over the specimen 22. If the disk 42 is turned out of the target position about an angle δ, the light beam obliquely enters the objective 24 by the same angle δ. The field stop image previously arranged in the center of the specimen 22 is thereby offset by a distance d [mm] from the image center, whereby:

$$d = f \cdot \tan \delta,$$

wherein f [mm] refers to a reference focal length, in the present embodiment to the focal length of the tube lens 16.

Provided that the requirement for the positioning accuracy of the field stop image at the location of the specimen 22 is that when switching between the different filter blocks 46, 48, 50 and 52 the field stop image may be shifted out of its centered required position maximally by +/−Δy [mm] at the location of the specimen 22, for the maximum angular deviation δ of the disk 42 results:

$$\delta = \arctan(\Delta y / f).$$

The predetermined rotary positions of the disk 42 have to be moved to with this angular accuracy.

If it is further assumed that the disk 42 has a radius r [mm], the angle δ corresponds to a distance x [mm] on the circumference of the disk 42, i.e. at the first toothing 80, into which the toothed belt 90 grips, wherein for x applies:

$$x = r \cdot \tan \delta.$$

The slip of the toothed belt 90 on the disk 42 and the toothed disk 74, i.e. the clearance which the toothing 90 exhibits with respect to the first and the second toothing 80, 76, should be smaller than x.

If, only exemplary, the following values are assumed:
f=200 mm,
δy=0.5 mm,
r=60 mm,
the value for x is 0.15 mm.

In FIG. 3, embodiments of the toothed belt 90 with different clearance x are shown. According to FIG. 3 the tooth space forms are also referred to as "normal gap", "SE gap" and "0 gap" from top to bottom. Thereby the SE gap exhibits a constricted backlash with respect to the normal gap. With the 0 gap the clearance x equals zero, i.e. the toothed belt 90 engages positively with the toothing 80 or 76.

The smaller the clearance x is, the higher is the positioning accuracy, however the higher is also the mechanical abrasion of the toothed belt 90, which consists e.g. of rubber. The previously explained determination of the clearance x allows for reaching a good compromise between a sufficient positioning accuracy and a least possible abrasion.

Figure 4:
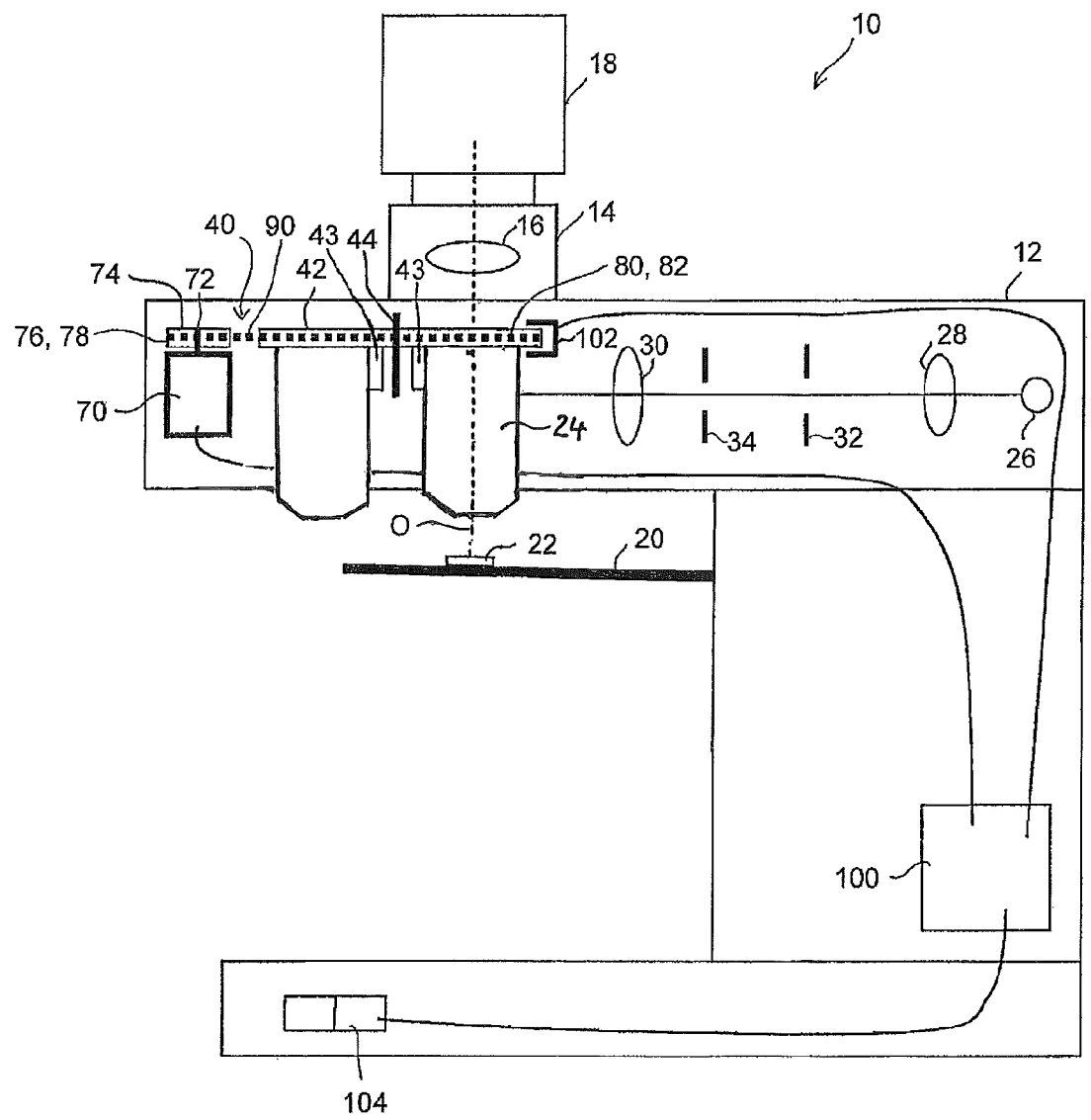
FIG. 4 shows a cross-sectional view of a microscope including a positioning apparatus according to a second embodiment.

FIG. 4 shows a second embodiment of the invention. In this second embodiment, objectives are positioned in the microscope in contrast to filter blocks as demonstrated in the first embodiment according to FIG. 1. As far as the embodiments of FIGS. 1 and 4 are identical, the same reference numerals are used in both Figures and it is referred to the description of the embodiment of FIG. 1.

LIST OF REFERENCE NUMERALS 10 fluorescence microscope
12 microscope body
14 tube
16 tube lens
18 CCD camera
20 stage
22 specimen
24 objective
26 light source
28 lens
30 lens 32 diaphragm
34 diaphragm
40 positioning apparatus
42 disk
44 rotation axis
43 receptacle
46 filter block
48 filter block
50 filter block
52 filter block
54 excitation filter
56 excitation filter
58 dichromatic beam splitter
60 dichromatic beam splitter
62 blocking filter
64 blocking filter
70 stepper motor
72 motor shaft
74 toothed disk
76 toothing
78 teeth
80 toothing
82 teeth
90 toothed belt
100 controller
102 fork light barrier
104 operating element

What is claimed is:

1. An apparatus for positioning optical components in an optical device, comprising:
a holding device having a plurality of receptacles on which the optical components can be fixed, wherein the holding device is rotatable into a plurality of predetermined rotary positions, in which rotary positions respectively one of the optical components is arranged in a target position,
a motor comprising a motor shaft for rotating the holding device, and
a transmitting mechanism for transmitting a rotary movement of the motor shaft into a rotary movement of the holding device, wherein
the transmitting mechanism comprises a toothed belt that is engaged with a first toothing arranged at the holding device and a second toothing arranged at the motor shaft,
the first toothing includes Z1 teeth and the second toothing includes Z2 teeth and the ratio Z1/Z2 is n times the number of the receptacles, provided with uniform angular distances from each other on the holding device, for the optical components, wherein n is a natural integer not equal to 0,
the motor is a stepper motor, and
the stepper motor is installed such that the motor shaft thereof is in a full step position when one of the optical components is arranged in the target position.

2. The apparatus according to claim 1, wherein the ratio Z1/Z2 is equal to the number of receptacles that are provided on the holding device for holding the optical components.

3. The apparatus according to claim 1, further comprising an initializing device that controls the stepper motor in the beginning of an operation of the apparatus such that the motor shaft is rotated into a predetermined initialization position.

4. The apparatus according to claim 3, wherein the initializing device comprises a light barrier for detecting the predetermined initialization position.

5. The apparatus according to claim 1, wherein the holding device is a first toothing disk including the first toothing along its circumference and that a second toothing disk is attached to the motor shaft including the second toothing along its circumference.

6. The apparatus according to claim 1, wherein a controller controls the stepper motor taking into consideration correction amounts that respectively indicate a correction offset with respect to the respective predetermined rotary position of the holding device.

7. The apparatus according to claim 1, wherein the apparatus is adapted to position objectives in a microscope.

8. The apparatus according to claim 1, wherein the apparatus is adapted to position filter blocks in a microscope.

9. The apparatus according to claim 8, wherein the toothed belt exhibits a clearance x with respect to the first toothing and the second toothing that satisfies the following condition (1):

$$x \leq r \tan \delta \qquad (1),$$ wherein $$\delta = \arctan(\Delta y/f),$$

r is the radius of the disk forming the holding device,
Δy is a tolerable deviation of an image of a field stop arranged in a microscope at a location of an object from a desired position, and
f is a reference focal length.

10. A microscope comprising:
at least two optical components; and
an apparatus for positioning the at least two optical components in the microscope, said apparatus comprising:
a holding device having a plurality of receptacles on which the at least two optical components can be fixed, wherein the holding device is rotatable into a plurality of predetermined rotary positions, in which rotary positions respectively one of the optical components is arranged in a target position,
a motor comprising a motor shaft for rotating the holding device, and
a transmitting mechanism for transmitting a rotary movement of the motor shaft into a rotary movement of the holding device, wherein
the transmitting mechanism comprises a toothed belt that is engaged with a first toothing arranged at the holding device and a second toothing arranged at the motor shaft,
the first toothing includes Z1 teeth and the second toothing includes Z2 teeth and the ratio Z1/Z2 is n times the number of the receptacles, provided with uniform angular distances from each other on the holding device, for the optical components, wherein n is a natural integer not equal to 0,
the motor is a stepper motor, and
the stepper motor is installed such that the motor shaft thereof is in a full step position when one of the optical components is arranged in the target position.

* * * * *